V. W. MASON, Jr. & G. I. ROCHELLE.
DESICCATING AND PULVERIZING APPARATUS.
APPLICATION FILED APR. 24, 1908.
933,090.
Patented Sept. 7, 1909.
2 SHEETS—SHEET 1.
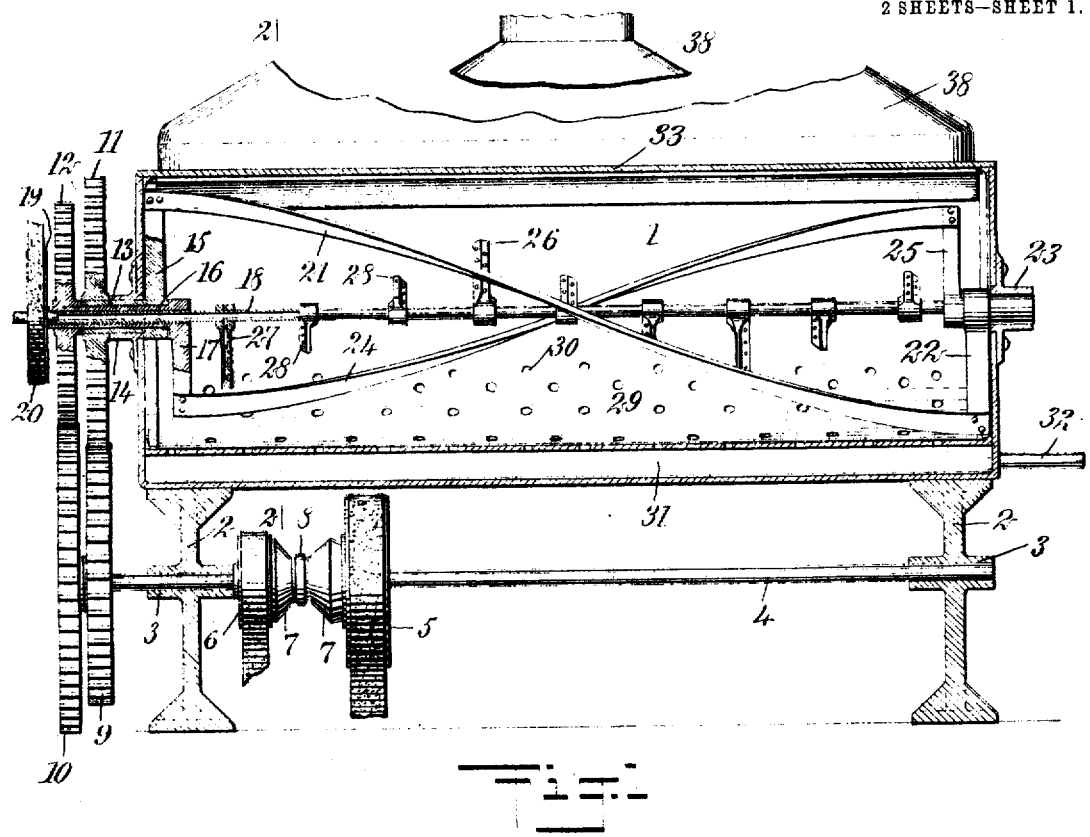
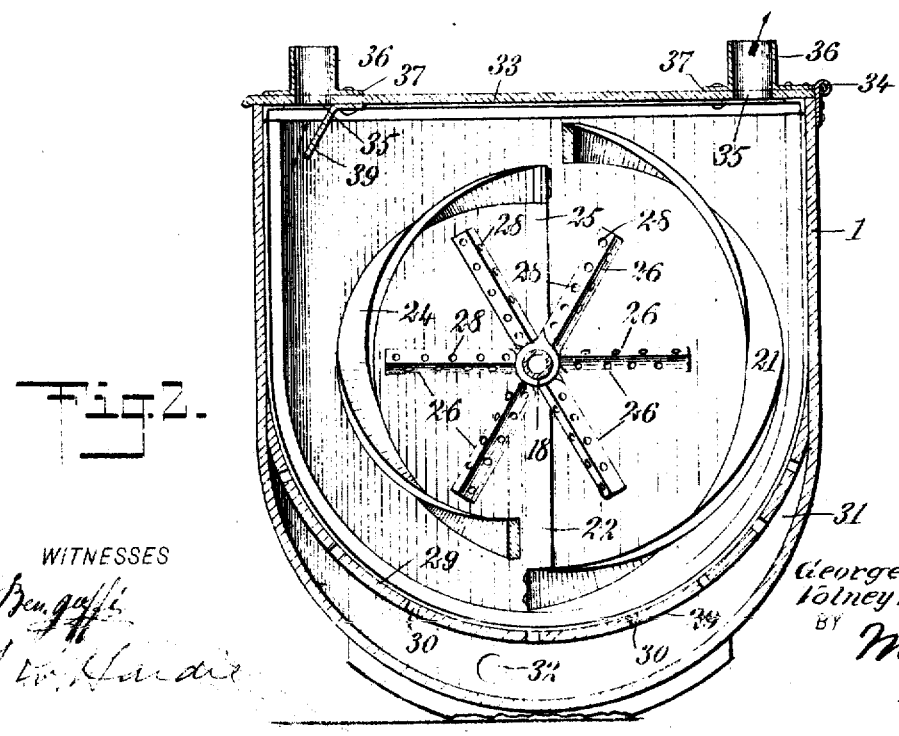
WITNESSES
INVENTORS
George I. Rochelle
Volney W. Mason Jr.
BY
ATTORNEYS V. W. MASON, Jr. & G. I. ROCHELLE.
DESICCATING AND PULVERIZING APPARATUS.
APPLICATION FILED APR. 24, 1908.
933,090.
Patented Sept. 7, 1909.
2 SHEETS—SHEET 2.
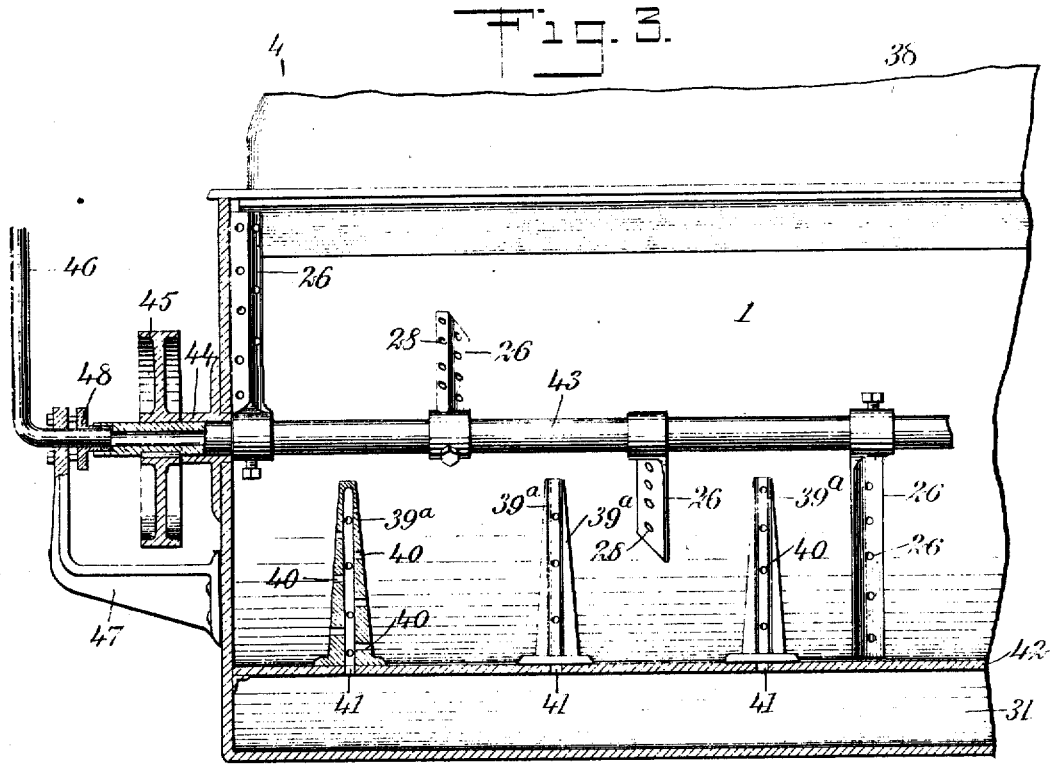
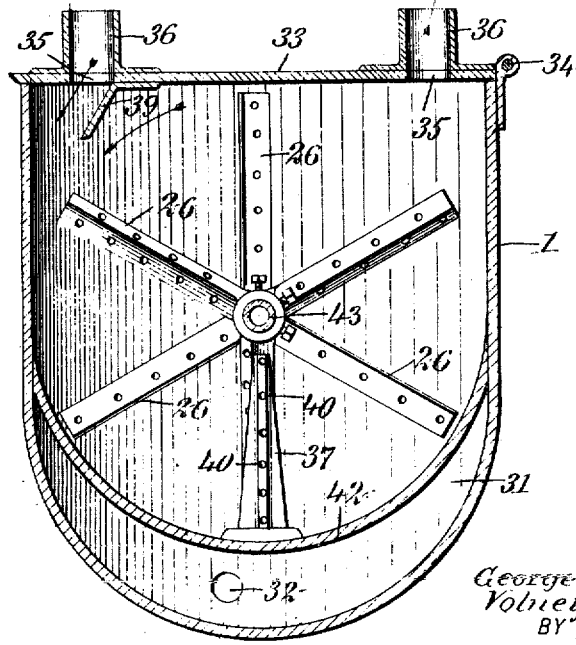
WITNESSES
INVENTORS
George I. Rochelle
Volney W. Mason Jr.
BY
ATTORNEYS

UNITED STATES PATENT OFFICE.

VOLNEY W. MASON, JR., AND GEORGE I. ROCHELLE, OF NEW YORK, N. Y.; SAID ROCHELLE ASSIGNOR TO STANDARD MILK FLOUR COMPANY, OF NEW YORK, N. Y., A CORPORATION OF MAINE.

DESICCATING AND PULVERIZING APPARATUS.

933,090.  Specification of Letters Patent.  Patented Sept. 7, 1909.

Application filed April 24, 1908. Serial No. 428,970.

*To all whom it may concern:*

Be it known that we, VOLNEY W. MASON, Jr., and GEORGE I. ROCHELLE, both citizens of the United States, and residents, respectively, of the city of New York, borough of Brooklyn, in the county of Kings and State of New York, and the city of New York, borough of Manhattan, in the county and State of New York, have invented a new and Improved Desiccating and Pulverizing Apparatus, of which the following is a full, clear, and exact description.

This invention relates to pulverizers adapted for various uses, but designed especially for pulverizing the solid constituents of milk in converting milk into a powder or flour. In carrying out such a process, the milk is first placed within a vacuum pan and subjected to the action of heat, which evaporates the greater part of the water from the milk. Some of the water is left in the milk, however, leaving the residue in a thick or pasty condition. This residue may be dried in any suitable manner until it forms into cakes or lumps, and then placed in a pulverizer to reduce the material into a powdered form.

This invention has for its primary object to take the thick pasty substance and convert it into a powder by a single operation, instead of first drying the material and then pulverizing it.

Other objects relating to the special construction and arrangement of the several parts constituting our invention will be readily understood from the following description and accompanying drawings, in which drawings like characters of reference indicate like parts throughout the views, and in which—

Figure 1 is a longitudinal section of a pulverizer embodying our invention; Fig. 2 is a vertical transverse section taken on the line 2—2 of Fig. 1; Fig. 3 is a longitudinal section, partly broken away, of a pulverizer embodying a modification of our invention; and Fig. 4 is a vertical transverse section taken on the line 4—4 of Fig. 3.

As illustrated in the drawings, a shell or casing 1 is provided with a semi-cylindrical bottom, and supported upon standards 2 of any suitable construction. The standards 2 are provided with bearings 3 adapted to journal a drive shaft 4 mounted in said bear-
ings. Drive pulleys 5 and 6 respectively, are loosely mounted upon the drive shaft, and each pulley engages a clutch member 7 having a splined engagement with the drive shaft and operated by a lever 8 in the usual manner. Driving gears 9 and 10 are fixedly attached to the drive shaft, the gear 9 engaging a gear 11 and the gear 10 engaging a gear 12.

The gear 11 is mounted upon a sleeve 13 journaled in a bearing 14 fixed to one end of the shell or receptacle 1. The inner end of the sleeve 13 is fixedly connected with an arm 15 arranged within the shell or receptacle 1. The sleeve 13 receives a similar sleeve 16 which is fixedly attached to the gear 12. The inner end of the said sleeve 16 is rigidly connected with an arm 17 arranged within the receptacle 1. The sleeve 16 in turn serves as a bearing for a hollow shaft 18. One end of this shaft projects beyond said sleeve and supports a driving pulley 19 having a belt 20 connected therewith. The outer end of the arm 15 is attached to a blade 21 preferably wide and thin in cross section, and extending in a helical line longitudinally of the casing. The opposite end of said blade is fixedly secured to another arm 22 similar to the arm 15, which is provided with a sleeve similar to the sleeve 16 and journaled in a bearing 23 attached to the opposite end of the casing. The arm 22 extends in a direction opposite to that of the arm 15, and the blade 21 consequently extends half way around the interior of the casing, as shown in Fig. 2. A blade 24 similar in general construction to the blade 21 is attached to the arm 17 at one end, the opposite end of said blade being fixed to an arm 25 extending in a direction opposite to that of the arm 17 and attached to a sleeve journaled in the sleeve of the arm 22, in the same manner as the sleeve 16 is journaled within the sleeve 13 at the opposite end of the casing. The blade 24 also extends half way around the interior of the casing in a helical line, in the same general manner as the blade 21. The arms 15 and 22 are of sufficient length to bring the outer edge of the blade 21 in close proximity to or in contact with the bottom of the casing, while the arms 17 and 25 are shorter than the arms 15 and 22 so as to enable the blade 24 to rotate inside the path of the blade 21 with the outer edge of the blade 24 in close proximity to or in actual contact with the inner edge of the blade 24. Beaters 26 are fixedly attached to the hollow shaft 18 and are arranged in staggered relation to each other. These beaters in cross section are preferably in the form of a right angle triangle. Longitudinal apertures 27 are formed in the beaters 26 which communicate with the interior of the hollow shaft 18, and apertures 28 are formed in the back and one side of the beaters so as to make a free communication between the interior of the hollow shaft 18 and the interior of the casing 1. The casing 1 is provided with an inner bottom 29 having perforations 30 formed therein. The bottom 29 is spaced from the outer bottom of the casing 1, making an intermediate chamber 31 having an inlet 32. The top of the casing is provided with a cover 33 which is secured by means of hinges 34 to one side of the casing 1. Slots 35 extend longitudinally of said cover on opposite sides thereof, and are inclosed by elongated ferrules 36 provided with flanges 37. These ferrules engage the lower end of hoods 38, which hoods extend longitudinally of said cover on opposite sides thereof. One of the slots 35 is intended as an inlet port, and the other as an outlet port. A deflecting plate 39 is attached to one side of the cover in line with the inlet opening 35.

When the device is in operation, the material to be treated is placed within the casing 1 by raising the cover 33. The cover is then secured at its free end to the shell by any suitable means. When the material is first placed within the receptacle it is of a thick consistency, and more power is required to drive the blades 21 and 24 through it. The clutch member 7 is, therefore, brought in engagement with the larger pulley 5, and the gears 9 and 10 set in operation, which in turn rotate the gears 11 and 12 and the sleeves 13 and 16 connected therewith, thereby rotating the arms 15 and 22 which carry the blades 21, and the arms 17 and 25 which carry the blade 24. These blades travel in the same direction. The hollow shaft 18 is started at the same time approximately as the drive shaft 14, thereby rotating the beaters 26 traveling inside the path of the blade 24. The rotation of the outer blade 21 scrapes the material from the bottom of the casing, lifts and turns it, and throws it inward where it is beaten and turned by the inner blade 24, which in turn throws the material inward onto the beaters 26. These beaters being staggered on the hollow shaft 18, beat and stir the material so that the material within the casing 1 is subjected to a thorough stirring, beating and disintegration.

It is the purpose of this invention to dry and aerate the material treated, and to this end a fan is connected with a hood inclosing the slot 35, forcing air through said slot into the interior of the casing. The deflecting plate 39 turns the current of air against the side of the casing so that it may rebound and deflect therefrom into the interior of the casing. A supply of air under pressure is also connected with the inlet 32 of the chamber 31, and this current of air is forced from said chamber through the perforations 30 up into the main chamber or casing. In addition to these air blasts or currents the hollow shaft 18 is also connected with a fan or blower and air is forced through said shaft and through the longitudinal apertures 27 of the beaters 26 and the apertures 28 of said beaters, from whence the air from the shaft 18 passes into the central portion of the interior of the casing. By means of these sources of air supply the material while being beaten and pulverized is thoroughly aerated, and after being so pulverized and aerated is forced outward through the outlet, indicated by the arrow in Fig. 2, into a receptacle so placed as to receive the flour or powder after it has been discharged from the main receptacle.

In the construction hereinbefore described, we have embodied our invention in the form preferred by us for use in most cases. The construction may be modified, however, without departing from our invention, and in some instances we prefer to dispense with the blades 21 and 24 and to use in lieu thereof the construction shown in Figs. 3 and 4 of the drawings. In such construction, the main portion of the casing 1 is similar to that shown in Figs. 1 and 2. Instead of perforating the entire bottom, however, the inner bottom of the casing may be provided with a longitudinal row of hollow abutments 39ª having apertures 40. Communicating with the interior of said abutments, perforations 41 are formed in the lower portion of the inner bottom 42 extending in line with the longitudinal opening of the abutments 39ª. These abutments 39ª are arranged alternately of the planes of rotation of the beaters 26. The beaters 26 are mounted upon a hollow shaft 43 journaled at its ends in bearings 44 attached to the ends of the receptacle. A driving pulley 45 is mounted upon the shaft 43, and a supply pipe 46 is connected with the hollow interior of the shaft 43. The end of the supply pipe 46 is off-set and supported on the upper end of a bracket 47, which is attached to one end of the casing 1. A suitable stuffing box 48 connects the supply pipe 46 with the end of the shaft 43.

Having thus described our invention what we claim as new and desire to secure by Letters Patent is:

1. In a desiccating and pulverizing apparatus, the combination with a receptacle, of a shaft extending longitudinally and centrally of said receptacle, sleeves having a telescopic engagement with each other mounted on the opposite ends of said receptacle, arms of different length secured to the inner end of the sleeves at each end of said receptacle, an outer blade extending spirally from one end to the opposite end of said receptacle, and secured at its ends to the longer of said arms, the intermediate portion of said blade being free, an inner blade extending spirally the length of said receptacle, and secured at its ends to the shorter of said arms, the intermediate portion of said blade being free, a main driving shaft, gears of different diameters mounted on one end of said driving shaft, and gears of different diameter mounted on said sleeves at one end of said receptacle to engage with the corresponding gears of the main driving shaft.

2. In a desiccating and pulverizing apparatus, the combination with a receptacle provided with a semi-circular bottom, of an outer blade extending in a helical line so arranged as to enable its outer edge to travel in close proximity with the surface of said bottom, an inner blade extending in a helical line with its outer edge adapted to travel in close proximity to the inner edge of the outer blade, arms arranged at opposite ends of said receptacle and attached to said blades, sleeves attached to the arms at the ends of said receptacle having a telescopic engagement with each other, gears of different diameters attached to said sleeves respectively, a hollow shaft journaled in the inner of said sleeves and extending longitudinally of said receptacle, beaters mounted on said shaft and having a hollow interior communicating with the interior of said hollow shaft by means of apertures formed in said shaft, and provided with discharge apertures communicating with the hollow interior of said beaters, and a driving wheel mounted on one end of said shaft outside of said receptacle.

3. In a desiccating and pulverizing apparatus, the combination with a receptacle, of a hollow shaft extending longitudinally of said receptacle, beaters mounted on said shaft and arranged in staggered relation to each other and provided with a hollow interior communicating with the interior of said shaft by means of apertures formed in said shaft, and provided with discharge orifices communicating with the interior of said receptacle, a driving wheel mounted on said hollow shaft and a cover for said receptacle provided with longitudinal slots extending on opposite sides of said cover, longitudinally thereof, forming inlet and discharge apertures respectively.

4. In a desiccating and pulverizing apparatus, the combination with a receptacle having an inner and an outer bottom, the inner bottom being semi-circular in cross section and provided with apertures adapted to enable air to pass from between said bottoms to the interior of said casing, a hollow shaft extending longitudinally of said receptacle, beaters mounted on said shaft arranged in staggered relation to each other, and provided with a hollow interior communicating with the interior of said shaft by means of apertures formed in said shaft, and discharge apertures formed in said beaters communicating with the interior of said receptacle, a drive wheel mounted on said hollow shaft and a cover for said receptacle provided with longitudinal slots on opposite sides of said cover extending longitudinally of the cover to form inlet and discharge apertures respectively.

5. In a desiccating and pulverizing apparatus, the combination with a receptacle having a bottom semi-circular in cross section, a shaft mounted in said receptacle, sleeves having a telescopic arrangement with each other and with said shaft, arms of different length attached to said sleeves at opposite ends of said receptacle, blades attached to the outer ends of said arms so that one blade will travel inside of the path of the other blade, gears of different diameters mounted on said sleeves at one end of the receptacle, a main driving shaft, gears of different diameters mounted on said shaft and meshing with the gears of the first named shaft, and clutch operated driving mechanism attached to the main shaft.

6. In a desiccating and pulverizing apparatus, the combination with a receptacle having inner and outer bottoms spaced from each other, the inner bottom being semi-circular in cross section and provided with perforations, an air supply pipe connected with the chamber between the inner and outer bottoms, sleeves having different diameters and a telescoping engagement with each other journaled on the opposite ends of said receptacle, arms of different length attached to said sleeves on opposite ends of the receptacle, blades extending in a helical line attached to the outer ends of said arms so as to travel in different paths, gears having different diameters attached to the said sleeves on one end of said receptacle, a main drive shaft, gears of different diameters secured to said drive shaft and meshing with the gears of said sleeves, and driving mechanism connected with the main drive shaft.

7. In a desiccating and pulverizing apparatus, the combination with a receptacle having a cover provided with longitudinal slots extending on opposite sides of said cover, and an inner and outer bottom, the inner bottom being semi-circular in cross section and provided with perforations communicating with the chamber between the inner and outer bottom, hoods inclosing the slots in the cover of said receptacle, an inlet extending into the chamber between the inner and outer bottom of the receptacle so as to enable air to be forced from said chamber into the interior of said receptacle, a hollow shaft extending longitudinally of the interior of said casing, beaters mounted on said shaft and provided with a hollow interior communicating with the interior of said shaft, and with discharge apertures opening into the interior of said casing, and means for rotating said shaft.

8. The combination with a receptacle having inner and outer bottoms spaced from each other, the inner bottom being semi-circular in cross section and provided with perforations, an air supply pipe connected with the chamber between the inner and outer bottoms, a cover for said receptacle provided with longitudinal slots extending on opposite sides of said cover, a shaft extending longitudinally of the interior of said receptacle, beaters mounted on said shaft, an outer blade extending in a helical line within said receptacle, with its outer edge arranged to travel in close proximity to the inner surface of the bottom of said receptacle, an inner blade having its outer edge arranged to travel in close proximity to the inner edge of the outer blade, said blades being arranged outside of the path of travel of the beaters, and means for rotating said blades at different speeds relatively to each other.

In testimony whereof we have signed our names to this specification in the presence of two subscribing witnesses.

VOLNEY W. MASON, Jr.
GEORGE I. ROCHELLE.

Witnesses:
ROBERT W. WADE,
EVERARD B. MARSHALL.